United States Patent
Pan

(10) Patent No.: US 9,244,266 B2
(45) Date of Patent: Jan. 26, 2016

(54) TUNABLE OPTICAL FILTER AND METHOD OF MANUFACTURE THEREOF

(71) Applicant: Lightwaves 2020, Inc., Milpitas, CA (US)

(72) Inventor: Jing-Jong Pan, Milpitas, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 0 days.

(21) Appl. No.: 14/559,752

(22) Filed: Dec. 3, 2014

(65) Prior Publication Data

US 2015/0085367 A1 Mar. 26, 2015

Related U.S. Application Data

(63) Continuation of application No. 13/967,153, filed on Aug. 14, 2013, now Pat. No. 8,934,164, which is a continuation of application No. 12/184,192, filed on Jul. 31, 2008, now Pat. No. 8,559,090.

(51) Int. Cl.

| | |
|---|---|
| *G02F 1/03* | (2006.01) |
| *G02F 1/07* | (2006.01) |
| *G02B 26/00* | (2006.01) |
| *G01J 3/26* | (2006.01) |
| *G02B 6/293* | (2006.01) |

(Continued)

(52) U.S. Cl.
CPC ............ *G02B 26/001* (2013.01); *B32B 37/144* (2013.01); *B32B 37/18* (2013.01); *G01J 3/26* (2013.01); *G02B 6/29358* (2013.01); *G02F 1/055* (2013.01); *G02F 1/0551* (2013.01); *B32B 2307/202* (2013.01); *B32B 2307/416* (2013.01); *B32B 2315/02* (2013.01); *B32B 2551/00* (2013.01); *G02B 1/11* (2013.01); *G02F 1/0553* (2013.01); *G02F 1/0556* (2013.01); *G02F 2001/213* (2013.01); *G02F 2201/38* (2013.01); *G02F 2202/28* (2013.01); *G02F 2203/055* (2013.01); *G02F 2203/21* (2013.01)

(58) Field of Classification Search
CPC ......... G02F 1/0316; G02F 1/055; G02F 1/03; G02F 1/0018
USPC .......................................... 359/245, 260, 263
See application file for complete search history.

(56) References Cited

U.S. PATENT DOCUMENTS

| | | |
|---|---|---|
| 4,201,450 A | 5/1980 | Trapani |
| 6,046,837 A | 4/2000 | Yamamoto |

(Continued)

FOREIGN PATENT DOCUMENTS

WO 0045202 A1 8/2000

*Primary Examiner* — Mahidere Sahle

(74) *Attorney, Agent, or Firm* — Aka Chan LLP

(57) ABSTRACT

A tunable optical filter is formed in the structure of an etalon. A thin electro-optic ceramic substrate is fixed between two end substrates. Each end substrate has an inner parallel surface toward said electro-optic ceramic substrate covered by an electrode layer and a reflecting layer. An adhesive which attaches the electro-optic ceramic substrate to each first and second end substrates has a consistency so as to avoid stress on the electro-optic ceramic substrate. A voltage imposed on the electro-optic ceramic substrate by the electrode layers on the inner parallel surfaces of the first and second end substrates effectively controls an optical distance between the reflective coating layers on the inner parallel surfaces of the first and second end substrates of the etalon structure. The electro-optic ceramic substrate is preferably PMN-PT ($(1-x)$ Pb $(Mg_{1/3} Nb_{2/3}) O_{3-x}$ — Pb Ti $O_3$) and no more than 160 μm thick.

10 Claims, 6 Drawing Sheets

(51) Int. Cl.
  *G02F 1/055* (2006.01)
  *B32B 37/14* (2006.01)
  *B32B 37/18* (2006.01)
  *G02F 1/21* (2006.01)
  *G02B 1/11* (2015.01)

(56) References Cited

U.S. PATENT DOCUMENTS

| | | |
|---|---|---|
| 7,376,291 B1 | 5/2008 | Wang et al. |
| 7,733,554 B2 | 6/2010 | Danner et al. |
| 2002/0141030 A1 | 10/2002 | Esener et al. |
| 2008/0013159 A1 | 1/2008 | Fallahi et al. |

TUNABLE OPTICAL FILTER AND METHOD OF MANUFACTURE THEREOF

RELATED APPLICATIONS

This application is a continuation of U.S. application Ser. No. 13/967,153, filed Aug. 14, 2013, entitled "A Tunable Optical Filter and Method of Manufacture Thereof," and assigned to the present assignee, now U.S. Pat. No. 8,934, 164, which issued Aug. 14, 2013, which is a continuation of U.S. application Ser. No. 12/184,192, filed Jul. 31, 2008, now U.S. Pat. No. 8,559,090, which issued Oct. 15, 2013.

BACKGROUND OF THE INVENTION

This invention is related to optical filters which can be tuned for signals at different wavelengths, and more particularly, to tunable optical filters of etalon-type construction.

Optical filters which are tunable are highly desirable components for optical networks and for some optical systems, such as spectrometers, for example. Optical filters typically transmit light at particular wavelengths and block light at other wavelengths. An optical filter which is tunable allows the wavelengths to be selected.

Tunable optical filters can be quite varied in construction. For example, liquid crystal cells, thin film filters, ruled gratings, distributed Bragg reflectors (gratings), and fiber Bragg gratings, a type of distributed Bragg reflector, have been used as the tuning constituents in tunable optical filters. Of course, other parts are required to operate the tuning constituent in a tunable optical filter. The resulting optical performance, reliability, speed of operation, cost and size, among many parameters, of such tunable optical filters vary widely.

One conventional (and simple) structure for an optical filter is the etalon in which two highly reflective, parallel surfaces form a resonating cavity for wavelength selection. This is the familiar Fabry-Perot interferometer. To make the etalon tunable, the optical distance between the two reflecting mirrors must be changed. This has been done conventionally by mechanical means, such as electrical motors, but motors being mechanical are fundamentally unreliable. The moving parts of a motor wear from friction, causing slop in the system, and can ultimately break down. Another drawback is that the mass of the motor parts slows the response time of such a filter. Additionally a motor is comparatively bulky which limits the applications of such tunable optical filters. Piezoelectric materials have been used in place of motors but these require very high voltages to effect the change in optical distance between the mirrors. The high voltages require special high voltage circuits and slow switching speeds and optical performance.

On the other hand, the present invention is directed toward ameliorating some of the disadvantages of an etalon-type tunable optical filter.

BRIEF SUMMARY OF THE INVENTION

The present invention provides for a tunable optical filter which has an electro-optic ceramic substrate having first and second parallel surfaces; first and second end substrates arranged on either side of the electro-optic ceramic substrate; and an adhesive attaching the electro-optic ceramic substrate to the first and second end substrates. Each end substrate has an inner parallel surface arranged toward the electro-optic ceramic substrate and an outer parallel surface arranged away from the electro-optic ceramic substrate. The inner parallel surface is covered by an electrode layer and a reflecting layer. The adhesive has a consistency which avoids stress on the electro-optic ceramic substrate. A voltage imposed on the electro-optic ceramic substrate, which preferably comprises PMN-PT ((1−x)Pb (Mg⅓ Nb⅔) $O_{3-x}$—Pb Ti $O_3$), by the electrode layers on the inner parallel surfaces of the end substrates effectively controls an optical distance between the reflective coating layers on the inner parallel surfaces of the first and second end substrates.

The present invention provides for a tunable optical filter which has first and second end substrates and an electro-optic ceramic substrate arranged between the first and second end substrates. Each end substrate has an inner parallel surface arranged toward the other end substrate which is covered by an electrode layer and a reflecting layer. The electro-optic ceramic substrate is no more than 160 μm thick and a voltage imposed on the electro-optic ceramic substrate by the electrode layers on the inner parallel surfaces of the end substrates effectively controls an optical distance between the reflecting coating layers on the inner parallel surfaces of the first and second end substrates.

The present invention provides for a method of manufacturing a tunable optical filter which has the steps of: depositing an electrode layer and a reflective coating layer on a flat surface of first and second end substrates; arranging the first and second end substrates so that the flat surface of each end substrate faces each other with an electro-optic ceramic substrate having first and second parallel surfaces therebetween; and attaching the electro-optic ceramic substrate to each flat surface of each first and second end substrates with an adhesive having a consistency so as to avoid stress on the electro-optic ceramic substrate.

The present invention also provides for a method of manufacturing a tunable optical filter which has the steps of: depositing an electrode layer and a reflective coating layer on a flat surface of first and second end substrates; polishing first and second parallel surfaces of an electro-optic ceramic substrate to no more than 160 μm thick; and arranging the end substrates so that the flat surface of each end substrate faces each other with the electro-optic ceramic substrate therebetween.

The present invention further provides for a method of manufacturing a tunable optical filter which has the steps of: polishing flat parallel surfaces of an electro-optic ceramic substrate; covering the parallel surfaces of the electro-optic ceramic substrate with anti-reflection layers; and arranging first and second end substrates having flat surfaces with the electro-optic ceramic substrate therebetween, a flat surface of each end substrate contacting an anti-reflection layer covering a flat parallel surface of the electro-optic ceramic substrate to minimize light reflection caused by air pockets between the electro-optic ceramic substrate and the first and second end substrates.

Other objects, features, and advantages of the present invention will become apparent upon consideration of the following detailed description and the accompanying drawings, in which like reference designations represent like features throughout the figures.

Figure 1A:
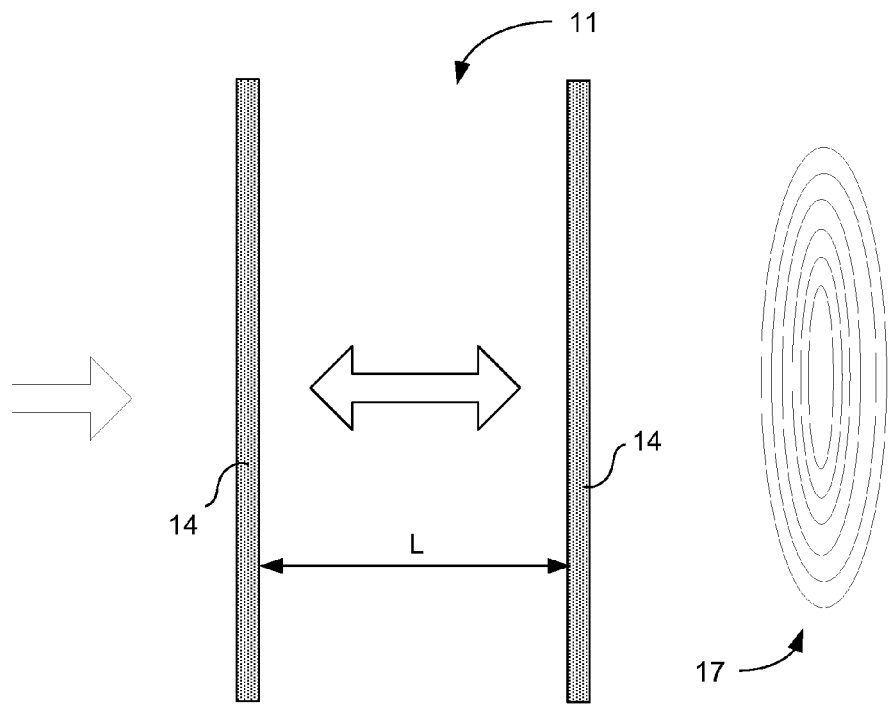
FIG. 1A is a simple representational diagram of an etalon.

It should be noted that the same reference numerals are used to designate elements in drawings with the same or similar functions as elements in other drawings to facilitate an understanding of the present invention. Furthermore, the drawings are not drawn to scale but are drawn to help support the text of the specification.

DETAILED DESCRIPTION OF THE INVENTION

FIG. 1A illustrates a simplified organization of an etalon. Two parallel, highly reflecting but partially transmitting, surfaces 14, define the resonating cavity 11 in which incoming light is multiply reflected. In this example light from the left is represented by an arrow and the multiple reflections are represented by a double-headed arrow. This arrangement is well-known in optics and is the basis of the Fabry-Perot interferometer.

With monochromatic light, a series of rings 17 is formed on the focal plane around the optical axis of the etalon representing constructive and destructive interference patterns of the light. These are shown as concentric rings about a central axis of the etalon. The particular interference pattern, or more specifically, the details of the interference pattern, is determined by the parameters of the etalon, including L, the separation between the surfaces 14, i.e., the length of the resonating cavity 11, the index of refraction n of the medium in the resonating cavity 11, and the wavelength $\lambda$ of the monochromatic light, and even the reflectivity R of the reflecting surfaces 14. Light with multiple wavelengths results in superimposed patterns of rings, each pattern for a wavelength.

Various arrangements have been used to adapt the device for different wavelengths of light. One classical arrangement is to vary the separation L to form a Fabry-Perot interferometer. The variation in one of the optical parameters allows the device to be "tuned" for one or more selected wavelengths. Rather than the separation L, a more subtle arrangement is to vary the index of refraction, n, in the cavity 11. In the FIG. 1A etalon, it was assumed that the resonating cavity 11 was filled with air, therefore setting n=1 and making the optical path separation between the reflecting services 14 equal to L, rather than n*L.

Figure 1B:
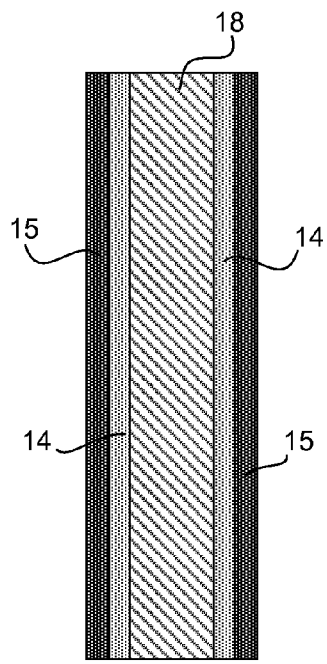
FIG. 1B illustrates an etalon in which an electro-optic ceramic substrate forms the resonating cavity of the FIG. 1A etalon.

In FIG. 1B an electro-optic ceramic material substrate 18 is placed between the reflecting surfaces 14. On the outside of the reflecting surfaces are electrode layers 15. A voltage difference on electrode layers 15 creates an electric field between the layers 15 and through the electro-optic ceramic material affects its index of refraction, n. Electro-optic ceramic materials, such as PZN-PT (Pb $(Zn_{1/3} Nb_{2/3}) O_3$—$BaTiO_3$—Pb Ti $O_3$) and PMN-PT ((1–x)Pb $(Mg_{1/3} Nb_{2/3}) O_{3-x}$—Pb Ti $O_3$), can be used for the substrate 18. FIG. 1B illustrates the general organization of a tunable optical filter, according to one embodiment of the present invention, but there are many problems in making a practical implementation of such a tunable optical filter.

One problem is that the electro-optic ceramic material requires a comparatively intense electric field, implying that high voltages are imposed upon the electrode layers 15. However, high voltages imply high-voltage circuits which operate at slower switching speeds necessitated by the high voltages, as compared to lower voltage circuits and high-voltage circuits are inherently more costly than circuits operating at lower voltages. The present invention ameliorates this and other problems in the implementation of a tunable optical filter with high optical performance at high speeds, good reliability and relatively low costs.

Figure 2A:
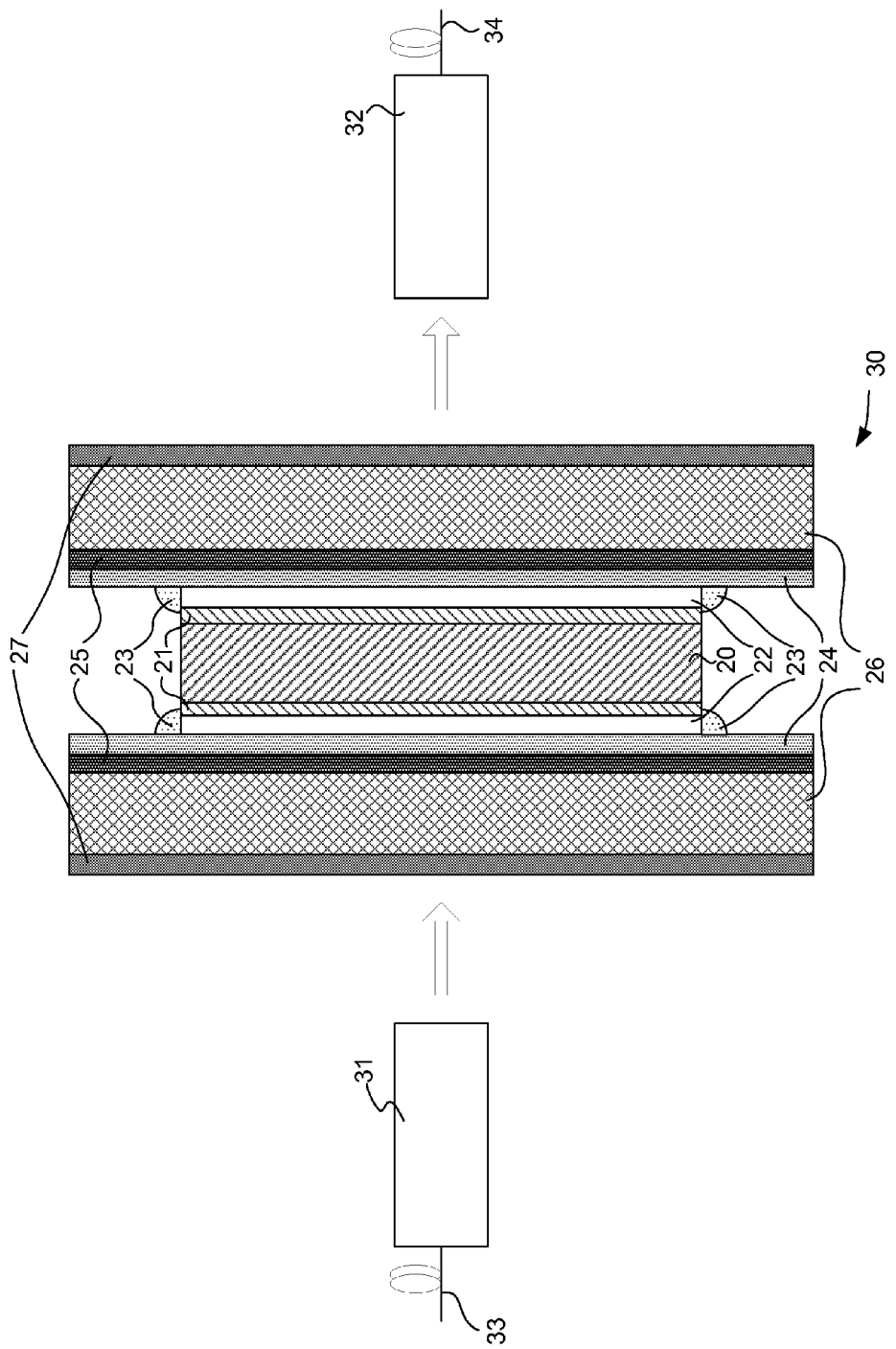
FIG. 2A is a representational cross-sectional diagram of a tunable optical filter, according to one embodiment of the present invention.

One embodiment of a tunable optical filter according to the present invention is shown in FIG. 2A. The filter has a filter core component 30 and two optical fiber components 31 and 32. The optical fiber component 31 holds an input optical fiber 33 and directs the light carried by the fiber 33 toward the filter core component 30 in a collimated fashion. After the light is filtered by the filter core component 30, the collimated light is focused on an end of the optical fiber 34 by the second optical fiber component 32.

The optical fiber components 31 and 32 are each formed by a ferrule into which its respective optical fiber is inserted. At the end of the fiber is a collimating lens in the case of the component 31 or focusing lens in the case of the component 32. GRIN (GRaded INdex) or aspherical lenses may be used for the collimating and focusing lenses. Optical fiber components, such as described, are found in many optical devices. A more detailed description can be found in U.S. Pat. No. 5,317, 655 which describes an optical isolator, for example.

The filter core component 30 has a thin substrate 20 of electro-optic ceramic material, such as PZN-PT or PMN-PT, at the component's center. Each parallel surface of the electro-optic ceramic substrate 20 is coated with a thin layer 21 of anti-reflection material to ensure maximum transmissitivity through the substrate 20. On either side of the substrate 20 are optically transparent substrates 26 of quartz or Si material. The substrates 26 have their outer parallel surfaces, i.e., the surfaces facing away from each other and toward the optical fiber components 31 and 32 respectively, coated with thin layers 27 of anti-reflection material also. The inner parallel surfaces, the surfaces facing toward each other, of the substrates 26 are each coated with a transparent electrode layer 25, such as a layer of ITO (Indium Tin Oxide) and a layer 24 of highly reflective material, such as dielectric coating.

To hold the electro-optic ceramic substrate 20 and its anti-reflection layers 21 against the two substrates 26 (and their coating layers 25 and 24), spots or dabs of soft adhesive 23 bind the substrate 20 to the layers 24 (and 25 and substrates 26). It is highly desirable that the surfaces of the substrates 20 and 26 be absolutely flat so as to contact each other with no voids between the surfaces. Voids create air-substrate interfaces which undesirably reflect light. However, such a degree of flatness is not always possible and the resulting air pockets are represented by space layers 22 in an exaggerated fashion. To ameliorate this problem, the anti-reflection layers 21 reduce the reflection caused by such voids.

The electro-optic ceramic substrate 20 is thin. The electro-optic ceramic is preferably PMN-PT and the substrate 20 is no more than 160 nm thick and hence is very sensitive to stresses. The adhesive 23 has a consistency which avoids stressing the substrate 20 even after the adhesive cures. It has been found that an adhesive, such as UV (Ultra-Violet)-cured epoxy from Electronic Materials, Inc. of Breckenridge, Colo. works effectively. The thinness of the electro-optic ceramic substrate 20 allows the electrode layers 25 to be placed closer together thereby increasing the strength of the electric field for a given voltage difference between the electrode layers 25. With the thinness of the substrate 20, only voltages of several hundred volts are required to generate the necessary electric field to vary the index of refraction n as desired for the operation of a tunable optical filter.

Figure 2B:
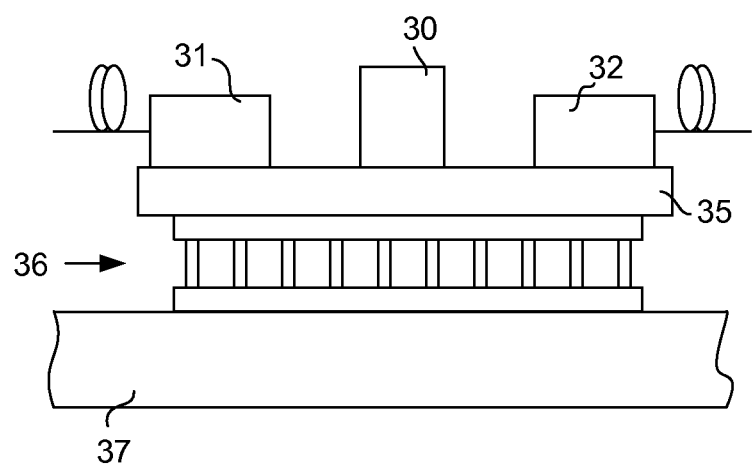
FIG. 2B illustrates how the FIG. 2A tunable optical filter is temperature-stabilized.

The electro-optic ceramic substrate 20 is also affected by changes in temperature. That is, temperature variations cause the changes in n, the index of refraction, and in the physical dimensions of the substrate 20. This is undesirable and the tunable optical filter is temperature-stabilized with a thermoelectric cooler unit, as illustrated by FIG. 2B. The filter core component 30 and the two optical fiber components 31 and 32 are mounted on a heat sink 35, the bottom of which is fixed to one surface of a thermoelectric cooler unit 36. The heat sink 35 allows the substrate 20 in the filter core component 30 to be thermally coupled to the thermoelectric cooler unit 36. The other surface of the thermoelectric cooler unit 36 is fixed to a base plate 37 of a larger device of which the tunable optical filter is a part. The wavy lines on the sides of the base plate 37 indicate that the base plate continues on to hold other parts of the device. Of course, the base plate 37 can terminate with the tunable optical filter to form a stand-alone tunable optical filter device. Electrical wires for the thermoelectric cooler unit 36 and for the filter core component 30 are not shown in the drawing.

FIGS. 3A-3H illustrate some of the steps in manufacturing a tunable optical filter, according to one embodiment of the present invention. It is again noted that the same reference numerals are used for similar or identical elements in previous drawings so that the reader can more easily follow the described manufacturing process.

Figure 3A:
FIGS. 3A-3H shows the steps of manufacturing a tunable optical filter according to one embodiment of the present invention.
Figure 3B:
Figure 3C:
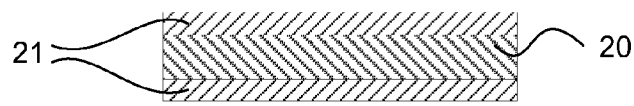
Figure 3D:
Figure 3E:
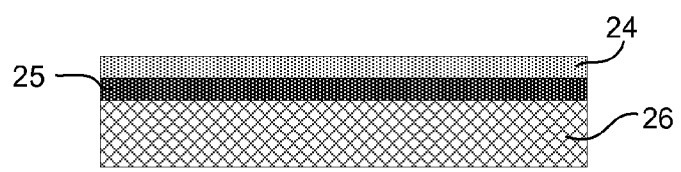

FIG. 3A shows an initial substrate 20A of electro-optic ceramic material, preferably PMN-PT. Substrates of PMN-PT may be obtained from Boston Applied Technologies, Inc. of Woburn, Mass. and have an initial thickness in the range of 1.0-1.5 mm. The substrate 20A is polished to a thickness of no more than 160 μm. As explained earlier, the resulting thin substrate 20 shown in FIG. 3B permits lower voltages to be used to control the index of refraction of the substrate 20. Besides reducing the thickness of the initial electro-optic ceramic substrate 20A, the polishing smoothes both sides of the substrate. Both sides of the polished substrate 20 are then coated with anti-reflection layers 21. This is illustrated in FIG. 3D. In passing, it is noted that though the anti-reflection layers 21 are shown as unitary in structure, each layer 21 is formed by multiple coatings.

Figure 3F:
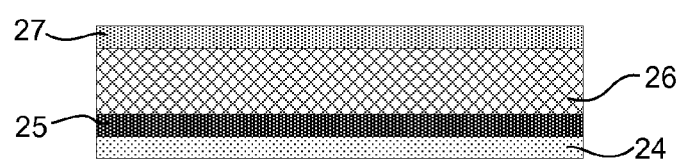

FIG. 3D shows that a quartz or Si substrate 26 is covered on one side by the electrode layer 25, typically formed by conducting ITO. The electrode layer 25 is then covered by highly reflective material, such as silver, and polished to form the reflecting layer 24, shown in FIG. 3E. The reflectivity R of the layer 24 forms one of the optical parameters of the tunable optical filter. FIG. 3F shows the coating of the other side of the substrate 26 with an anti-reflection layer 27.

Figure 3G:
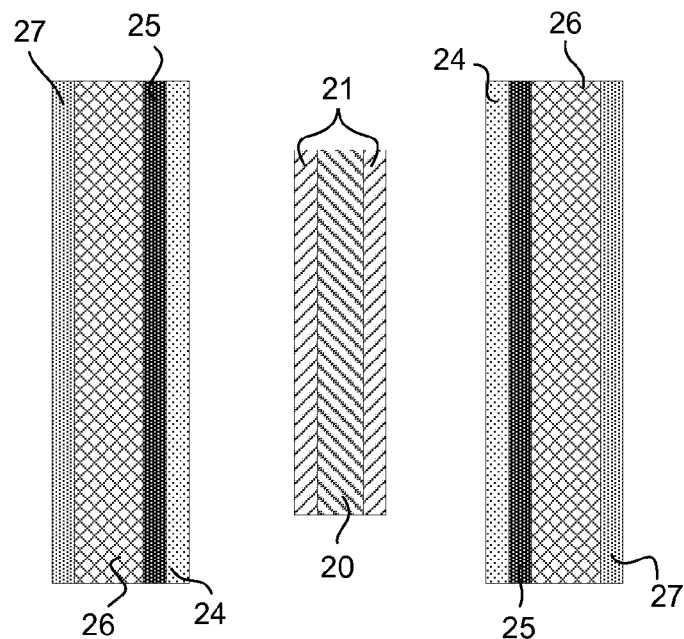
Figure 3H:
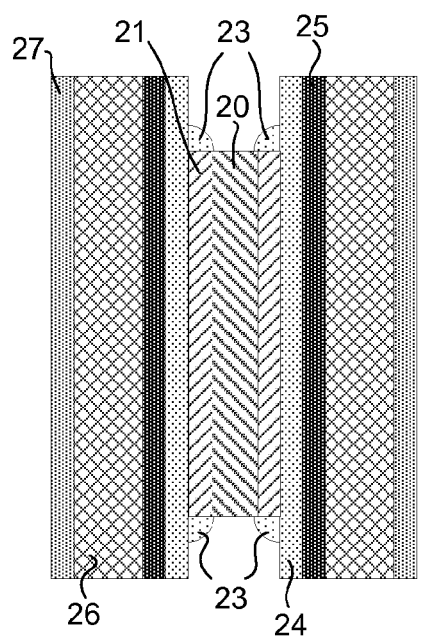

The electro-optic ceramic substrate 20 with anti-reflection layers 21 is placed between two substrates 26 which have their respective electrode and reflection layers 25 and 24 facing each other. This is illustrated in FIG. 3G and the electro-optic ceramic substrate 20 is held in place between the two substrates 26 by spots or dabs of adhesive 23, as shown in FIG. 3H. Because of the thinness of the substrate 20, the adhesive has a consistency even after curing which avoids putting a stress on the substrate 20. The stress interferes with the operation of the tunable optical filter. It is believed that the electro-optic effect is adversely affected by any stress on the substrate 20.

FIG. 3H does not show the space layers 22 (see FIG. 2) which represent voids and air pockets between the anti-reflection layers 21 and reflecting layers 24. FIG. 3H is a more realistic representation of the tunable optical filter in the sense of scale since the voids are created by minute irregularities in the flatness of the electro-optic ceramic substrate 20 and the reflecting layer 24s. The anti-reflection layers 21 on the substrate 20 ensure that deleterious reflections caused by the void/substrate 20 interface are minimized.

In the resulting tunable optical filter, the intervening electro-optic ceramic substrate 20 effectively changes the optical distance of the resonating cavity 11 between the reflecting layers 24 by changing the index of refraction of the substrate 20 in response to changes in the voltage across the electrode layers 25. The voltage between the electrode layers 25 "tunes" the etalon structure to the desired optical distance, n*L. By appropriately selecting the parameters of the tunable optical filter using relationships developed for etalons and Fabry-Perot interferometers, such as the Free Spectrum Range (FSR) which is given by:

$$\Delta v = \frac{c}{2nL},$$

in terms of frequency for normally incident light; and in terms of wavelength, $$\Delta \lambda = \frac{\lambda^2}{2nL};$$

and the Finesse which is given by:

$$\frac{\Delta \lambda}{\delta \lambda} = \frac{\pi \sqrt{R}}{1-R}$$

where $\delta \lambda$ is the full width half-maximum, the wavelength between the two points of a maximum at half strength, the described tunable optical filter can be designed for the desired optical performance. The FSR defined by the thickness L and n, the index of refraction, of the electro-optic ceramic substrate 20, is the wavelength separation between two adjacent maxima (the rings) in an interference pattern for a given wavelength $\lambda$ and is one measure of the resolution of an etalon and Fabry-Perot interferometer. The Finesse is ratio of the FSR, the wavelength separation between two adjacent maxima, to the full-width half-maximum, and is defined by the reflectivity R of the reflecting layers 25.

Figure 4:
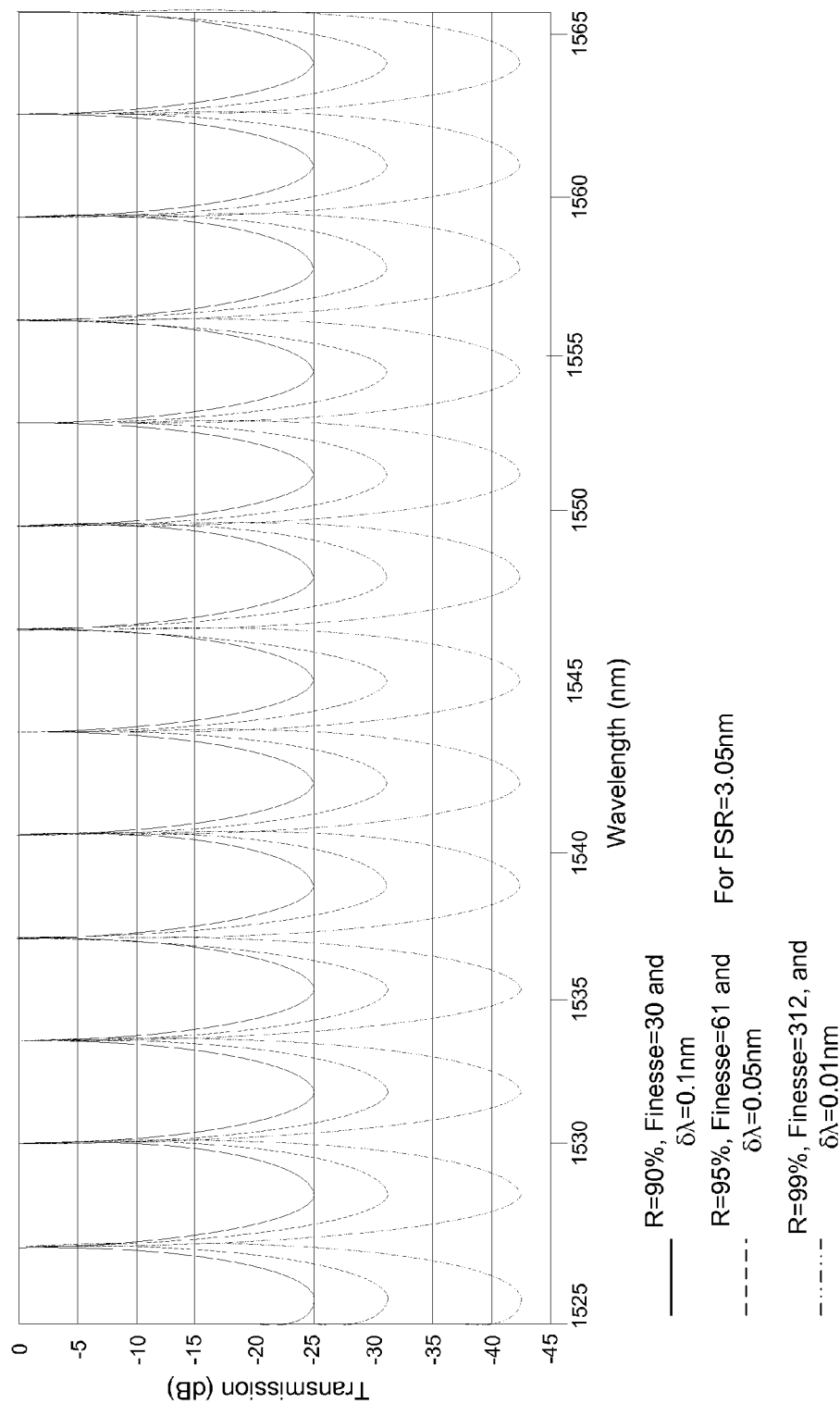
FIG. 4 is a plot of transmission versus wavelength of a FIG. 2A tunable optical filter.

For example, FIG. 4 illustrates the transmission output versus wavelength of a tunable optical filter with a 160 μm thick, PMN-PT substrate, according to one embodiment of the present invention. The wavelengths are in the bandwidths for DWDM (Dense Wavelength Division Multiplexing) and the transmission outputs correspond to an FSR=3.05 nm for different values of R, Finesse and $\delta \lambda$.

The present invention allows a tunable optical filter which can operate at high speeds with optimum optical performances. Scanning speeds up to 1 MHz with a tuning range of 1500 nm to 1610 nm at 0.01 nm resolution are possible. Furthermore, the tunable optical filter has a low insertion loss and is insensitive to polarization of the input optical signal. Physically, the tunable optical filter is immune to shock compared to existing tunable optical filter devices since it has no moving parts and can be built in small convenient packages at relatively low costs.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A tunable optical filter comprising:
   first and second end substrates, each end substrate having an inner parallel surface arranged toward each other, said inner parallel surface covered by an electrode layer and a reflecting layer; and
   an electro-optic ceramic substrate having first and second parallel surfaces arranged between said first and second end substrates, said electro-optic ceramic substrate no more than 160 µm thick;
   whereby a voltage imposed on said electro-optic ceramic substrate by said electrode layers on said inner parallel surfaces of said first and second end substrates effectively controls an optical distance between said reflecting layers on said inner parallel surfaces of said first and second end substrates.

2. The tunable optical filter of claim 1 wherein said electro-optical ceramic substrate comprises PMN-PT $((1-x)Pb(Mg_{1/3} Nb_{2/3}) O_{3-x}$—$Pb\ Ti\ O_3)$.

3. The tunable optical filter of claim 1 further comprising first and second anti-reflection layers respectively covering said first and second parallel surfaces of said electro-optic ceramic substrate.

4. A method of manufacturing a tunable optical filter comprising:
   depositing an electrode layer and a reflective coating layer on a flat surface of first and second end substrates;
   polishing an electro-optic ceramic substrate to no more than 160 µm thick with first and second parallel surfaces; and
   arranging said first and second end substrates so that said flat surface of each end substrate faces each other with said electro-optic ceramic substrate therebetween.

5. The method of claim 4 wherein said electro-optical ceramic substrate comprises PMN-PT $((1-x)Pb(Mg_{1/3} Nb_{2/3}) O_{3-x}$—$Pb\ Ti\ O_3)$.

6. A miniature Fabry-Perot interferometer comprising:
   first and second optically transparent plates, each plate having an inner parallel surface arranged toward each other, said inner parallel surface covered by an electrode layer and a reflecting layer; and
   an electro-optic ceramic substrate having first and second parallel surfaces arranged between said first and second optically transparent plates, the electro-optic ceramic substrate no more than 160 µm thick, a voltage imposed on the electro-optic ceramic substrate by the electrode layers on the inner parallel surfaces of the first and second end substrates effectively controlling an optical distance between the reflecting layers on the inner parallel surfaces of the first and second optically transparent plates;
   whereby the Fabry-Perot interferometer forms a tunable optical filter.

7. The miniature Fabry-Perot interferometer of claim 6 wherein the electro-optical ceramic substrate comprises PMN-PT $((1-x)Pb(Mg_{1/3} Nb_{2/3}) O_{3-x}$—$Pb\ Ti\ O_3)$.

8. The miniature Fabry-Perot interferometer of claim 6 further comprising first and second anti-reflection layers respectively covering said first and second parallel surfaces of said electro-optic ceramic substrate.

9. A method of manufacturing a miniature Fabry-Perot interferometer capable of operating as a tunable optical filter, comprising:
   depositing an electrode layer and a reflective coating layer on a flat surface of first and second end substrates;
   polishing an electro-optic ceramic substrate to no more than 160 µm thick with first and second parallel surfaces; and
   arranging the first and second end substrates so that the flat surface of each end substrate faces each other with the electro-optic ceramic substrate therebetween.

10. The method of claim 9 wherein the electro-optical ceramic substrate comprises PMN-PT $((1-x)Pb(Mg_{1/3} Nb_{2/3}) O_{3-x}$—$Pb\ Ti\ O_3)$.

* * * * *